United States Patent
Adiraju

(10) Patent No.: US 8,613,661 B2
(45) Date of Patent: Dec. 24, 2013

(54) RESOURCE VALIDATION

(75) Inventor: Srinivyasa M. Adiraju, Vernon Hills, IL (US)

(73) Assignee: WMS Gaming Inc., Waukegan, IL (US)

(*) Notice: Subject to any disclaimer, the term of this patent is extended or adjusted under 35 U.S.C. 154(b) by 733 days.

(21) Appl. No.: 12/523,435

(22) PCT Filed: Jan. 22, 2008

(86) PCT No.: PCT/US2008/000812
§ 371 (c)(1),
(2), (4) Date: Jul. 16, 2009

(87) PCT Pub. No.: WO2008/094420
PCT Pub. Date: Aug. 7, 2008

(65) Prior Publication Data
US 2010/0048296 A1 Feb. 25, 2010

Related U.S. Application Data

(60) Provisional application No. 60/886,673, filed on Jan. 26, 2007.

(51) Int. Cl.
*A63F 9/24* (2006.01)
(52) U.S. Cl.
USPC .............................. 463/29; 463/43
(58) Field of Classification Search
None
See application file for complete search history.

(56) References Cited

U.S. PATENT DOCUMENTS

| | | | |
|---|---|---|---|
| 6,088,797 A * | 7/2000 | Rosen | 713/173 |
| 7,096,362 B2 * | 8/2006 | Morgan et al. | 713/175 |
| 7,294,056 B2 * | 11/2007 | Lowell et al. | 463/17 |
| 2003/0196085 A1 * | 10/2003 | Lampson et al. | 713/156 |
| 2004/0185931 A1 | 9/2004 | Lowell et al. | |
| 2006/0091196 A1 | 5/2006 | Durham et al. | |
| 2006/0095760 A1 * | 5/2006 | Benantar et al. | 713/156 |
| 2007/0006321 A1 | 1/2007 | Bantz et al. | |
| 2007/0033392 A1 * | 2/2007 | Ganesan et al. | 713/155 |
| 2007/0067618 A1 * | 3/2007 | Sandhu et al. | 713/155 |
| 2007/0261051 A1 * | 11/2007 | Porter et al. | 717/174 |

OTHER PUBLICATIONS

International Application Serial No. PCT/US2008/000812, International Search Report Mailed Jun. 19, 2008, 4 pgs.
International Application Serial No. PCT/US2008/000812, Written Opinion Mailed Jun. 19, 2008, 6 pgs.

* cited by examiner

*Primary Examiner* — Kakali Chaki
*Assistant Examiner* — Walter Hanchak
(74) *Attorney, Agent, or Firm* — Schwegman, Lundberg & Woessner, P.A.

(57) ABSTRACT

A system, method, and medium are provided for resource validation. A resource to be loaded within a machine is associated with a digital certificate. The digital certificate's validation is at least partially dependent on an access key included within a BIOS of the machine. When the digital certificate is successfully validated, the resource is permissibly loaded within the machine for subsequent execution.

21 Claims, 8 Drawing Sheets

RESOURCE VALIDATION

RELATED APPLICATION

This patent application is a U.S. National Stage Filing under 35 U.S.C. 371 from International Patent Application Serial No. PCT/US2008/000812 filed Jan. 22, 2008, and published on Aug. 7, 2008 as WO 2008/094420 A1, which claims the priority benefit of U.S. Provisional Patent Application Ser. No. 60/886,673 filed Jan. 26, 2007 and entitled "RESOURCE VALIDATION", the contents of which are incorporated herein by reference in their entirety.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2007, 2008, WMS Gaming, Inc.

FIELD

Embodiments of the inventive subject matter relate generally to security and more particularly to resource validation.

BACKGROUND

Wagering game machine makers continually provide, new and entertaining games. One way of increasing entertainment value associated with casino-style wagering games (e.g., video slots, video poker, video black jack, and the like) includes offering a variety of base games and bonus events. However, despite the variety of base games and bonus events, players often lose interest in repetitive wagering gaming content. In order to maintain player interest, wagering game machine makers' frequently update wagering game content with new game themes, game settings, bonus events, game software, and other electronic data.

When distributing new wagering game content to wagering game machines in the field, wagering game machine operators typically manually deliver the content to each wagering game machine. For example, when deploying new wagering game content, operators typically replace existing media (e.g. ROM, CD-ROM, or flash RAM) with new media containing updated wagering game content. For wagering game machine operators owning scores of machines, this process can be relatively laborious and expensive.

BRIEF DESCRIPTION OF THE FIGURES

Embodiments of the invention are illustrated by way of example and not limitation in the Figures of the accompanying drawings in which.

DESCRIPTION OF THE EMBODIMENTS

Figure 1:
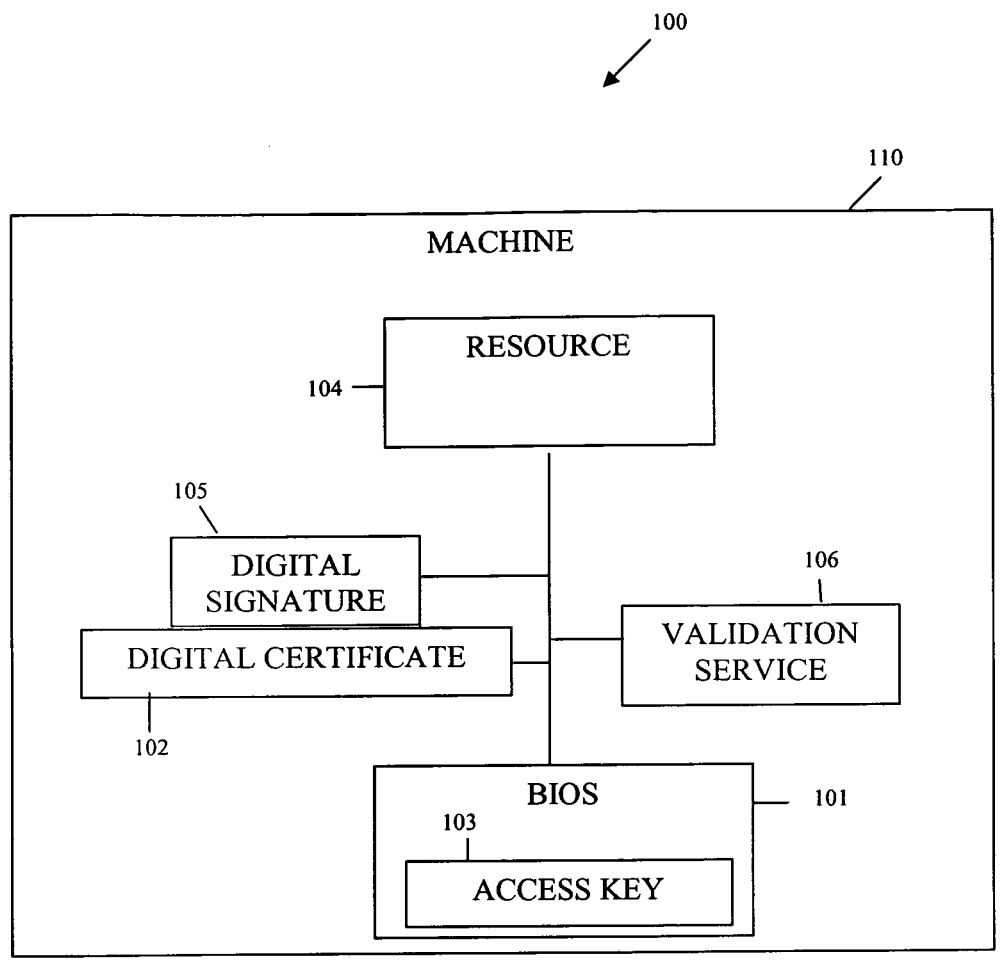
FIG. 1 is a diagram illustrating a resource validation system, according to an example embodiment of the invention.

FIG. 1 is a diagram illustrating a resource validation system 100, according to an example embodiment of the invention. The resource validation system 100 is implemented on a machine as instructions and/or data structures that when processed within the machine performs resource validation.

A BIOS is a Basic Input/Output (I/O) System or is sometimes also referred to as Basic Integrated Operating System (OS). A BIOS is software code that is run by a machine when it is powered up. One function of a BIOS is to prepare a machine for other software to load and control the machine.

A digital certificate is a data structure that binds together a digital signature with a public key for identity information about an entity. The certificate is used to verify that a public key belongs to a particular entity. In Public Key Infrastructure (PKI) applications, a Certificate Authority (CA) may supply the signature. In a web of trust scheme, the signature may be that of the individual or company (self-signed certificate) or that of some trusted third party (endorser). In either approach, the signature on the certificate is an attestation by the certificate signor that identity information and the public key included in the certificate belong together. A certificate includes a variety of other information and may take slightly different formats.

For example, an X.509 certificate binds a public key to a Distinguished Name or Alternate name, such as email address or, Domain Name Service entry (domain name). Some information included in an X.509 certificate may include version number, serial number, algorithm identifier, certificate issuer, validity period, subject or entity, entity public key information (public key algorithm used and public key), issuer's unique identifier, entity unique identifier, and perhaps other extensions. The X.509 certificate also includes a signature algorithm and a signature.

As used herein a "machine" refers to any processing device, such as but not limited to computers, phones, televisions, appliances, personal digital assistants, media players, and the like. A "resource" refers to software applications, services, systems, data stores, directories, file systems, operating systems, etc. A "key" refers to a special type of data or information that is used to at least partially gain access to a resource within a machine. In an embodiment, a "key" is either a public or private key associated with a public-private key pair used in PKI applications.

It is with this brief context that the resource validation system 100 is now discussed with reference to the FIG. 1 and its components.

The resource validation system 100 includes a BIOS 101 and a digital certificate 102. In some cases, the resource validation system 100 may also include a digital signature data structure 105 and a validation service 106. Each of these components and their interactions with one another will now be discussed in turn.

The BIOS 101 resides within or is capable of being installed within a machine 110. The BIOS 101 is used to configure the machine 110 at startup (when the machine is powered up). The BIOS 101 includes an access key 103. The access key 103 is used to at least partially validate a resource 104 for loading within the machine 110 during startup.

According to an embodiment, the access key 103 is a public key of an enterprise or entity that distributes the machine 110 and/or the resource 104. Moreover, the resource 104 maybe a wagering gaming software service or a suite of wagering gaming software services.

The digital certificate 102 is accessible to the machine 110 and the BIOS 101 during startup. Moreover, the digital certificate 102 is adapted to be at least partially validated at startup via the access key 103, which resides in the BIOS 101. That is, in a typical scenario validation of the digital certificate 102 would not be dependent upon a key included in BIOS of a machine; however, the resource validation system 100 performs an initial and pre-validation of the digital certificate 102 by using the access key 103 in the manners discussed more completely herein and below.

It is said that the digital certificate 102 is at least partially validated using the access key because further validation of the digital certificate 102 occurs after initial validation to ensure a digital signature 105 associated with the digital certificate 102 is verifiable. Moreover, even after the digital signature 105 is verified or validated, the strictures included within the digital certificate 102 have to be satisfied before the resource 104 can be properly validated for loading within the machine 110. In other words, the digital certificate 102 may be for a different version of the resource 104 than what is recognized at startup, in which case the resource 104 is invalid. It may also be the case that the digital certificate 102 supplies a validity period for the resource 104 to be usable and the validity period may have expired. This is another scenario where the resource 104 is invalid for loading within the machine 110.

According to an embodiment, the digital certificate 102 is incomplete in the form received within the machine 110 until it is populated with the access key 103. So, a public key portion of the digital certificate 102 may be padded with some other characters or information and may not properly include a public key. The access key 103 is the proper public key and until the access key 103 is extracted from the BIOS 101 at startup and merged into the proper location of the digital certificate 102, the digital certificate 102 is incomplete and is incapable of being checked for validity. So, verification of the digital certificate 102 relies on properly assembling and modifying the digital certificate 102 with the access key 103 natively housed in the BIOS 101. Such a scenario prevents errant resources from being installed on the machine 110 even if those errant resources have legitimate certificates because the machine 110 relies on acquiring the access key 103 from BIOS 101 to complete the digital certificate 102 for subsequent verification.

In an embodiment, the digital certificate 102 is in an X.509 compliant format and initially lacks a public key or lacks a legitimate value for that public key. The proper value for the public key to complete the digital certificate 102 is the access key 103 included in the BIOS 101. So, the digital certificate 102 is essentially split and becomes X.509 compliant once the access key 103 is combined and merged into the digital certificate 102.

In another case, the digital certificate 102 is complete in its native form that is initially acquired within the machine 110. However, other validation services used at startup perform an initial pre-validation on the digital certificate 102 that compares the public key included in the digital certificate 102 against the access key 103 acquired from the BIOS 101. If no match is achieved, then the machine 110 determines the digital certificate 102 is invalid and the resource 104 will not be loaded into the machine 110. So, the digital certificate 102 may be split and missing a legitimate public key or it may be complete and ruled invalid if its public key does not match the access key 103 acquired from the BIOS 101.

Initial acquisition of the digital certificate 102 by the machine 110 can occur in a variety of manners. For example, the digital certificate 102 may be initially acquired from memory associated with the machine 110, storage associated with the machine 110, a different machine that is operable to communicate the digital certificate 102 via a wired or wireless connection or even a port associated with the machine 110, a portion of the resource that includes the digital certificate 102, an OS of the machine 110, a removable machine-readable medium operable to be interfaced to the machine 110, etc. It may also be that a different machine 110 that supplies the digital certificate 102 may reside in a remote location and uses a network connection to communicate with the machine 110.

In an embodiment, the resource validation system 100 may also include a digital signature 105 associated with the digital certificate 102 and validation service 106. The digital signature 105 may be acquired within the machine 110 in manners similar to how the digital certificate 102 may be acquired. Also, the digital signature 105 may actually be part of the digital certificate 102. The validation service 106 is initiated within the machine 110 during startup.

The validation service 106, at startup, merges the access key 103 from the BIOS 101 into a proper location for a public key within the digital certificate 102. Next, the validation service 106 generates a checksum value or some hash value on a predefined and selective portion of the resource 104. The portion does not have to be contiguous. In other words, the portion may be the first N bytes of data associated with the resource 104, another X bytes of data in a middle position of the resource 104, and Y bytes of data at the end of the resource 104. Actual instructions on how to obtain the portion for generating the checksum or hash value may be included in the digital certificate 102. Next, the validation service 106 decrypts the digital signature 105 with the access key 103 and compares the decrypted value against the checksum or hash value. If there is a match, then the validation service 106 concludes that subsequent evaluation and validation of the digital certificate 102 with respect to the resource 104 may permissibly proceed. If there is no match, then the digital certificate 102 and/or the resource 104 is invalid and will not be loaded into the machine 110. If there is a match, then conditions defined within the digital certificate 102 still have to be satisfied before the resource 104 can be loaded into the machine. Conditions associated with the digital certificate 102 may include, but are not limited to, such things as resource version number, resource validity period, etc. The validation service 106 may be used to evaluate conditions in the digital certificate 102 or alternatively another third-party certificate validation service may be used to inspect the conditions.

It is also noted that certain characters in the digital certificate 102 may be ignored and the access key 103 acquired from BIOS 101 used in their place. So, the digital certificate 102 may include some ignored characters that are replaced with the access key 103. In other cases, there are no filling characters at all in the digital certificate 102; rather at a certain position within the digital certificate 102 the access key 103 is expanded into that position to complete the digital certificate 102.

It is now appreciated how the integrity of a machine 110 and any resource 104 that is to be loaded therein at startup may be securely verified while still supporting the industry and government movements toward certificate processing. This makes secure machines, such as wagering gaming machines, operable with certificate processing without compromising the integrity of the machines. It also makes it easier to distribute resources to these types of machines, since the BIOS 101 may just house a public key 103 that does not change very frequently; thus, updates to the BIOS 101 do not have to occur with new releases of resources to include newer keys. A single public key 103 may be stored in BIOS 101 for an entire enterprise or entity. The proper public key 103 can be extracted based on an entity identifier included in the certificate 102.

It should also be noted that multiple public keys 103 may be used in the BIOS 101. Each public key 103 may be associated with a particular game or a particular version of a single game. Thus, a plurality of keys may be included in the BIOS 101 and/or used for integration with a single digital certificate 102 or multiple digital certificates 102 and also used for validation at startup.

Figure 2:
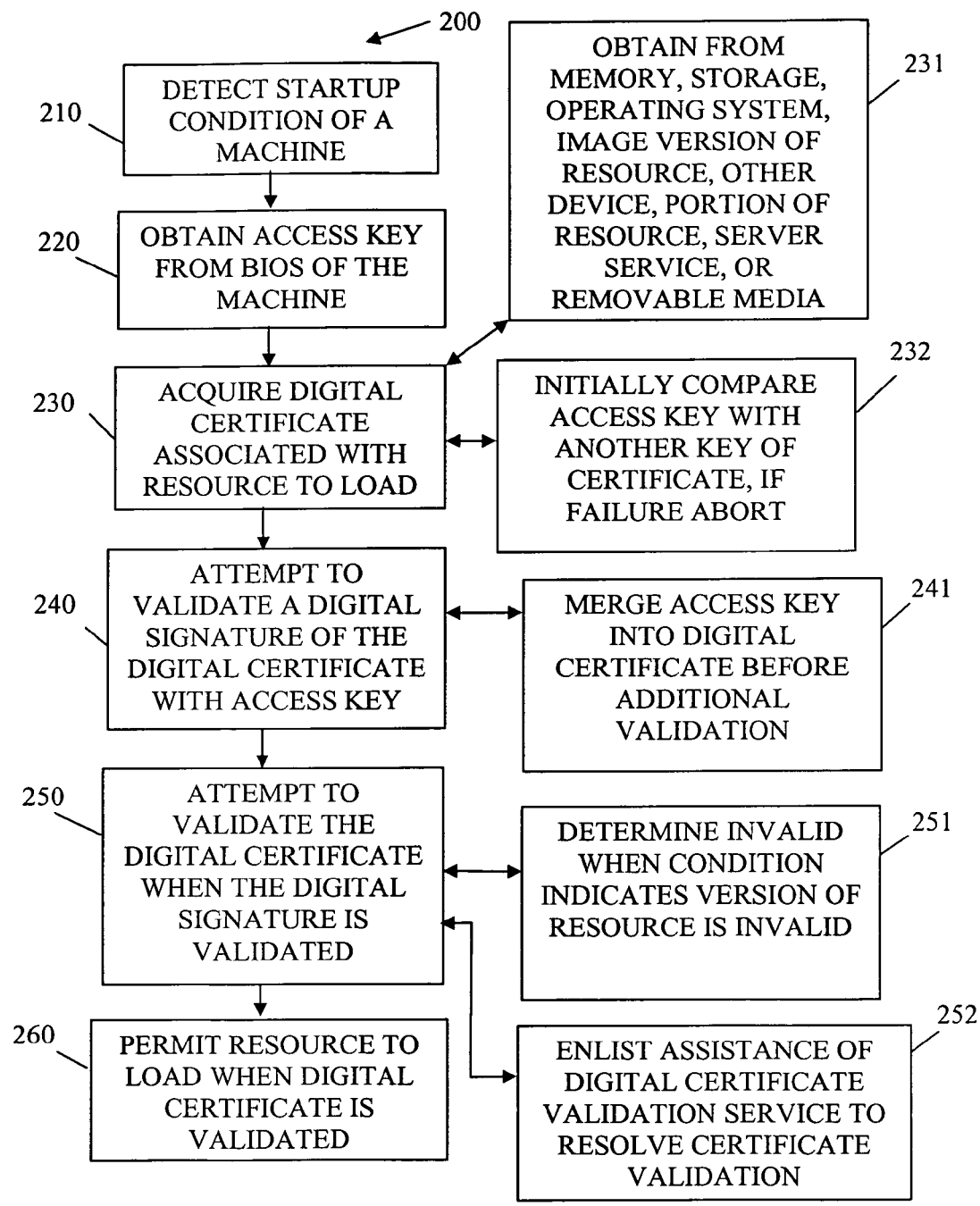
FIG. 2 is a diagram for a method to validate a resource, according to an example embodiment of the invention.

FIG. 2 is a diagram for a method 200 to validate a resource, according to an example embodiment of the invention. The method 200 (hereinafter referred to as "resource validation service") is implemented as instructions on a machine. The instructions when executed perform the processing depicted by the FIG. 2. In an embodiment, the resource validation service is implemented within and utilizes the resource validation system 100 described above with reference to the FIG. 1.

At 210, the resource validation service detects a startup condition of a machine. In fact, at startup for the machine, the resource validation service is initiated and knows that the machine is in the startup process and that resources are being loaded within the machine to process on the machine and to control some aspects of that machine. The boot procedure of the machine may then initiate the resource validation service for processing during startup.

At 220, the resource validation service obtains an access key for a resource that is attempting to load to the machine during startup. This can occur in a variety of manners. For example, the resource attempting to load has an identifier and that identifier may be used to index into the BIOS of a machine to acquire the access key. In another situation, a digital certificate (discussed below) associated with the resource or part of the resource may include an entity or issuer identifier and that identifier can be used to index into the BIOS of the machine to acquire the access key.

At 230, the resource validation service acquires a digital certificate associated with the resource that is attempting to load in the machine. Again, the location of the digital certificate can be determined in a variety of manners. For example, at 231, the resource validation service may acquire the digital certificate from memory that has already loaded it to the machine; from storage associated with the machine; from the OS associated with the machine; from an image version of the resource; from another device in communication with the machine; from a portion of the resource (e.g., metadata, header, etc.); from a server service networked to the machine; from removable media; etc.

According to an embodiment, at 232, the resource validation service may initially compare the access key with another key, such as a public key, housed in the digital certificate. If there is no match, the processing may abort and be logged and/or reported and no further validation of the digital certificate and the resource occurs, and the resource does not load to the machine. If there is a match, then further processing depicted in the FIG. 2 may proceed.

At 240, the resource validation service attempts to validate a digital signature of the digital certificate with the acquired access key. This can be done in a number of ways. For example, a selective portion or discontinuous portions of the resource may be hashed to acquire an initial value. The hashing algorithm may be acquired from the digital certificate or may be preconfigured within the resource validation service. The access key is then used to decrypt the digital signature of the digital certificate. The hash value is then compared to the decrypted signature. A match indicates that the signature portion of the digital certificate is valid. No match aborts processing and prevents the resource from loading.

In an embodiment, at 241, the resource validation service may also merge the access key into the digital certificate before any additional validation takes place. That is, the original digital certificate may have lacked a public key or may have the public key portion of the digital certificate padded with incorrect key information. The merge makes the certificate whole and complete for subsequent validation and evaluation against the resource that is attempting to load into the machine.

At 250, the resource validation service attempts to validate the digital certificate when the digital signature has been validated or verified. Again this can occur in a variety of manners.

For example, at 251, the resource validation service may also proceed to determine that the certificate is invalid for the version of the resource that is attempting to load in response to conditions evaluated within the certificate. Such a condition may indicate that the version of the resource defined in the certificate does not match the version of the resource trying to load. Another condition may be that the validity period for a proper version of the resource has expired indicating an updated license for the resource or even updated version of the resource is to be used.

It may also be, at 252, that the conditions of the certificate are actually evaluated by enlisting assistance of a third-party digital certificate validation service to ultimately complete the validation of the certificate with respect to the resource. So, the resource validation service may handle conditional evaluation of the certificate or the resource validation service may request third-party assistance to achieve this.

At 260, the resource validation service permits the resource to load within the machine when the digital signature and the digital certificate have been validated and the conditions of the digital certificate have been satisfied. If any validation or condition fails, then the resource is not permitted to load within the machine. Failure may also trigger logging, reporting, and/or notification procedures.

Figure 3:
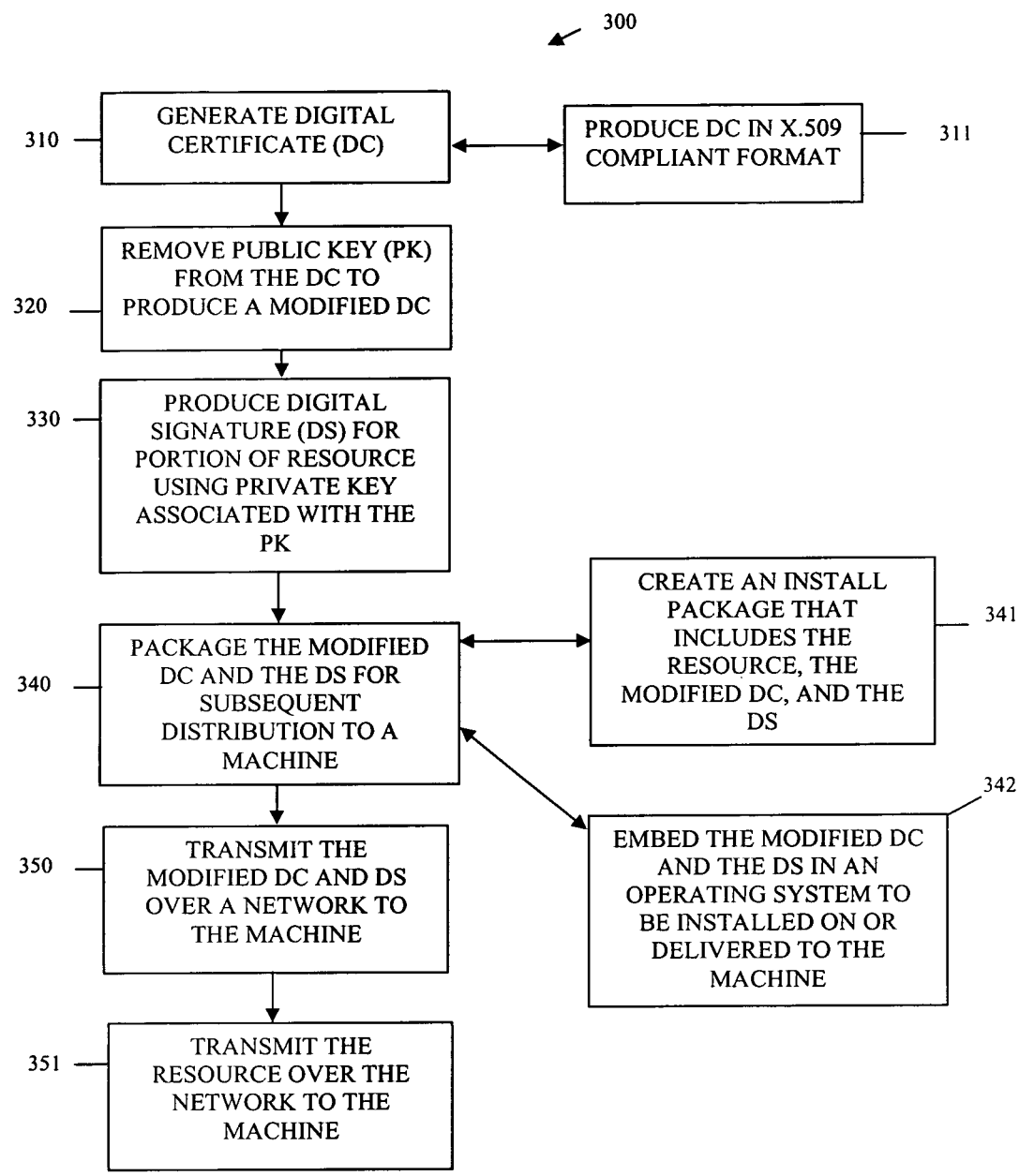
FIG. 3 is a diagram for a method to distribute and package information for subsequent validation of a resource, according to an example embodiment.

FIG. 3 is a diagram for a method 300 to distribute and package information for subsequent validation of a resource, according to an example embodiment. The method 300 (hereinafter referred to as "validation packaging and distributing service") is implemented as instructions on a medium. The medium when processed by a machine performs the processing depicted by FIG. 3.

The validation packaging and distributing service provides at least some of the initial information that the resource validation system 100 of the FIG. 1 and that the resource validation service of the FIG. 2 use to perform resource validation within a target machine. So, at least some of the data structures consumed by and relied upon by the resource validation system 100 and the resource validation service are initially packaged for delivery to their machines by the validation packaging and distributing service.

At 310, the validation packaging and distributing service generates a digital certificate for a given resource. According to an embodiment, at 311, the validation packaging and distributing service may produce the digital certificate in an X.509 compliant format.

At 320, the validation packaging and distributing service removes the public key portion of the certificate and perhaps pads the location that housed the public key with zeros or other bogus and non valid characters. This produces a modified certificate that is invalid for use without the proper public key information that has been stripped out in the modified certificate. The public may be previously distributed with the BIOS's of machines that are the target of the modified digital certificate.

At 330, the validation packaging and distributing service produces a digital signature for a portion of the resource to which the certificate relates. This is done by selecting data (continuous or discontinuous) from the data associated with the resource and then encrypting that with a private key. The private key is associated with the enterprise or distributor of the resource. The signature can be subsequently validated when the same portion of data is hashed using a same hashing algorithm as what the validation packaging and distributing service used, at 330, and then by decrypting the signature with the public key (missing in the modified version of the certificate) and performing a compare.

At 340, the validation packaging and distributing service packages the modified certificate and the signature for subsequent distribution to a machine. That machine has a BIOS having the public key that was stripped from the modified certificate.

According to an embodiment, at 341, this may entail creating an install packet that includes the resource, the modified digital certificate, and the digital signature. It is noted that the digital signature may actually be part of the modified digital certificate. In other words, the digital signature is embedded as part of the modified digital certificate.

In still another case, at 342, the validation packaging and distributing service may embed the modified digital certificate and the digital signature in an OS to be subsequently installed and delivered to the target machine or set of machines.

It may also be that the modified digital certificate and the digital signature are delivered to a target machine independent of the resource. That is, the modified certificate and signature may be an updated version of a previously expired certificate that the machine has already but that is about to expire. In another case, the resource may be delivered to the machine either before or after the modified certificate and signature is delivered. So, the package may or may not include the resource that is the subject of the modified certificate and signature.

In an embodiment, at 350, the validation packaging and distributing service may transmit the modified digital certificate and the accompanying digital signature over a network connection to the target machine. It may also be the case, at 351, that the resource is also transmitted over the network. The machine is now in a position to perform novel validation against the modified certificate and the resource using the signature and a prior installed public key housed in the BIOS of the machine in the manners discussed above with reference to the FIGS. 1 and 2.

It is noted that the validation packaging and distributing service does not have to just transmit the package, which includes the modified certificate and signature and perhaps the resource, over a network connection to distribute it to the target machine. It may be the case that the package is installed on a portable media that can be subsequently interfaced to the machine or installed on a portable device that subsequently communicates with the machine.

It is now understood how a resource, such as a software service, may be reliably validated for a particular machine architecture using the resource validation system 100 of the FIG. 1, the resource validation service of the FIG. 2, and the validation packaging and distributing service of the FIG. 3. The Figures that follow depict particular machine architectures, networks, and environments within which the resource validation techniques may be beneficially deployed or implemented.

It is to be understood that although the architectures, networks, and environments presented below are depicted for use within the wagering gaming industry that the teachings presented herein are equally beneficial in other industries having other devices and architectures. Some example devices that may use the teachings presented herein to validate resources include, but are not limited to, personal digital assistants (PDA's), phones (e.g., digital, cellular, GPS enabled, etc.), set-top-boxes (e.g., digital cable, satellite, etc.), media devices (e.g., iPod®, MP3 players, video players and recorders, etc.), televisions, intelligent appliances, network devices, and the like. Consequently, the descriptions that follow should be viewed as one example set of machines, networks, and environments for a particular industry (wagering gaming industry) within which the teachings presented herein are particularly useful but other arrangements may also exist.

Example Operating Environment

Example Wagering Game Machine Architecture

Figure 4:
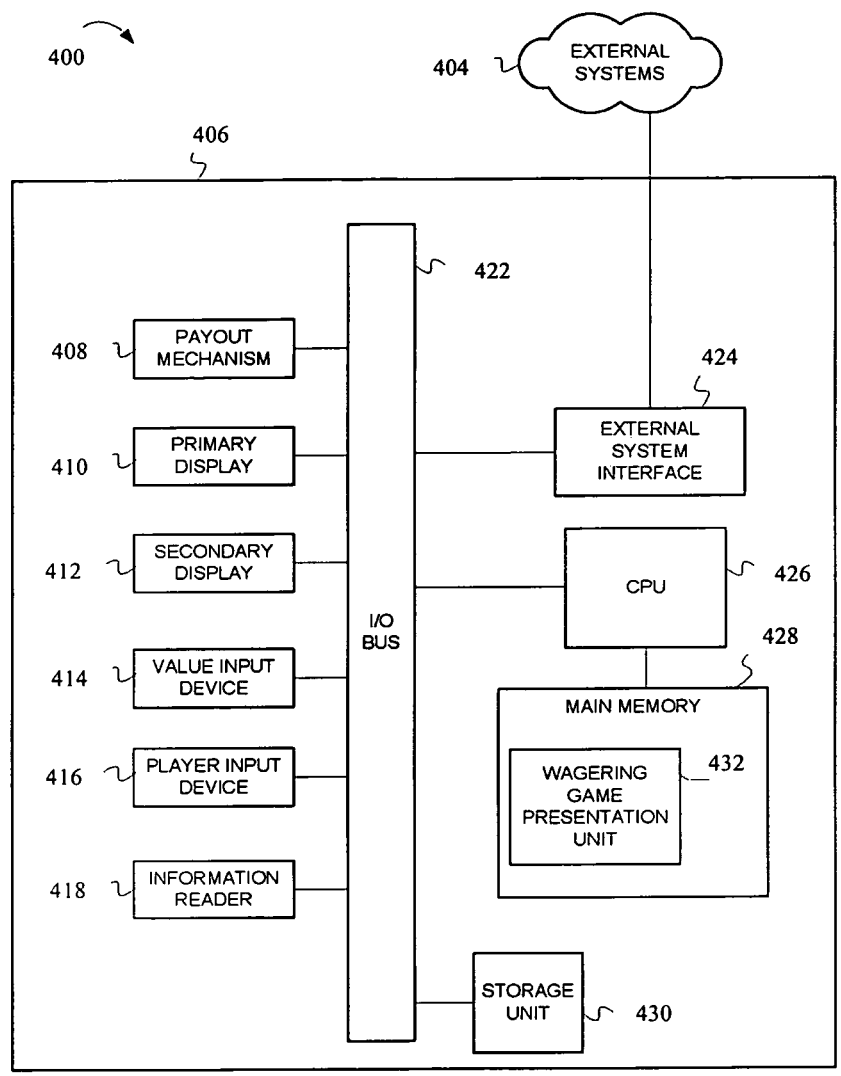
FIG. 4 is a diagram illustrating an example wagering game machine architecture, including a control system that the system and methods may be deployed on or interfaced to, according to an example embodiment of the invention.

FIG. 4 is a block diagram illustrating a wagering game machine architecture 400, including a control system, according to example embodiments of the invention. As shown in FIG. 4, the wagering game machine 406 includes a central processing unit (CPU) 426 connected to main memory 428, which includes a wagering game presentation unit 432. In one embodiment, the wagering game presentation unit 432 can present wagering games, such as video poker, video black jack, video slots, video lottery, etc., in whole or part.

The CPU 426 is also connected to an input/output (I/O) bus 422, which facilitates communication between the wagering game machine's components. The I/O bus 422 is connected to a payout mechanism 408, primary display 410, secondary display 412, value input device 414, player input device 416, information reader 418, and storage unit 430. The player input device 416 can include the value input device 414 to the extent the player input device 416 is used to place wagers. The I/O bus 422 is also connected to an external system interface 424, which is connected to external systems 404 (e.g., wagering game networks).

In one embodiment, the wagering game machine 406 can include additional peripheral devices and/or more than one of each component shown in FIG. 4. For example, in one embodiment, the wagering game machine 406 can include multiple external system interfaces 424 and multiple CPUs 426. In one embodiment, any of the components can be integrated or subdivided. Additionally, in one embodiment, the components of the wagering game machine 406 can be interconnected according to any suitable interconnection architecture (e.g., directly connected, hypercube, etc.).

In one embodiment, any of the components of the wagering game machine 406 can include hardware, firmware, and/or software for performing the operations described herein. Machine-readable media includes any mechanism that provides (e.g., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Figure 5:
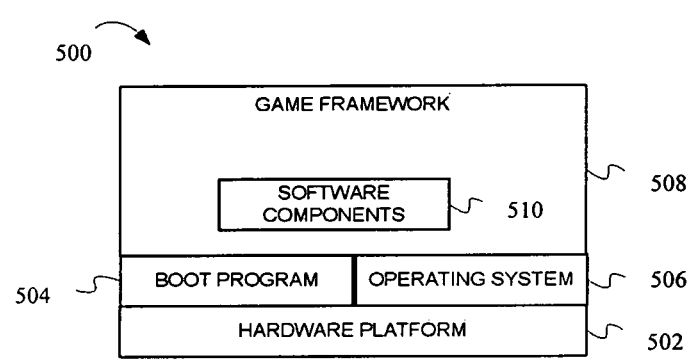
FIG. 5 is a diagram illustrating an architecture for an example wagering game machine the system and methods may be deployed on or interfaced to, according to an example embodiment.

Referring now to FIG. 5, there is illustrated a block diagram of an architecture for a wagering game machine 500, according to example embodiments of the inventive subject matter. As shown in FIG. 5, the wagering game architecture includes a hardware platform 502, a boot program 504, an operating system 506, and a game framework 508 that includes one or more wagering game software components 510. In various embodiments, the hardware platform 502 may include a thin-client, thick-client, or some intermediate derivation. The hardware platform 502 may also be configured to provide a virtual client. The boot program 504 may include a basic input/output system (BIOS) or other initialization program that works in conjunction with the operation system 506 to provide a software interface to the hardware platform 502. The game framework 508 may include standardized game software components either independent or in combination with specialized or customized game software components that are designed for a particular wagering game. In one example embodiment, the wagering game software components 510 may include software operative in connection with the hardware platform 502 and operating system 506 to present wagering games, such as video poker, video blackjack, video slots, video lottery, etc., in whole or part. According to another example embodiment, the software components 510 may include software operative to accept a wager from a player. According to one example embodiment, the game software components 510 include one or more components to validate a resource. According to another example embodiment, one or more of the software components 510 may be provided as part of the operating system 506 or other software used in the wagering game system 500 (e.g., libraries, daemons, common services, etc.).

While FIGS. 4 and 5 describe example embodiments of a wagering game machine architecture, FIG. 4 shows how a plurality of wagering game machines can be connected in a wagering game network.

Example Wagering Game Network

Figure 6:
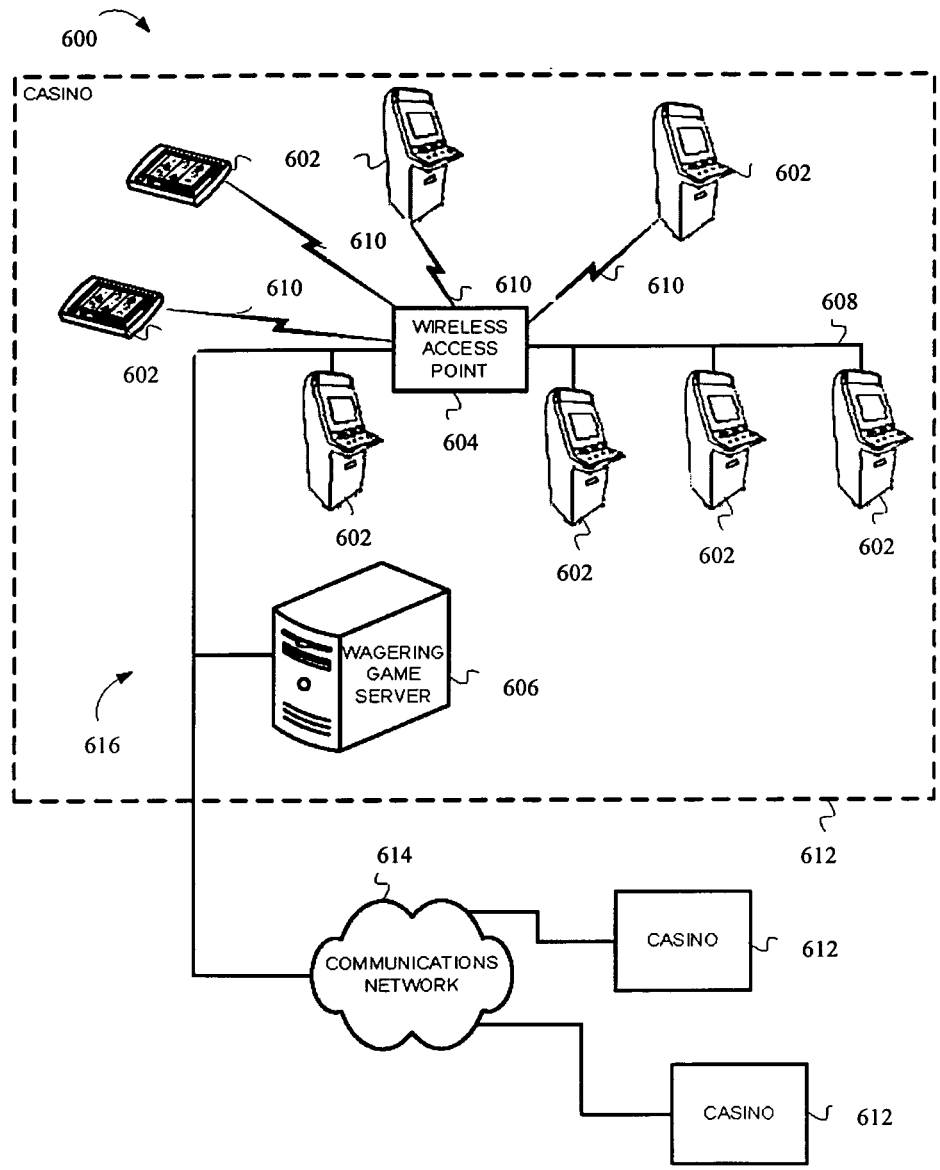
FIG. 6 is a diagram illustrating an example wagering game network 300, which the system and methods may be communicating on according to an example embodiment of the invention.

FIG. 6 is a block diagram illustrating a wagering game network 600, according to example embodiments of the invention. As shown in FIG. 6, the wagering game network 600 includes a plurality of casinos 612 connected to a communications network 614.

Each of the plurality of casinos 612 includes a local area network 616, which may include a wireless access point 604, wagering game machines 602, and a wagering game server 606 that can serve wagering games over the local area network 616. As such, the local area network 616 includes wireless communication links 610 and wired communication links 608. The wired and wireless communication links can employ any suitable connection technology, such as Bluetooth, 802.11, Ethernet, public switched telephone networks, SONET, etc. In one embodiment, the wagering game server 606 can serve wagering games and/or distribute content to devices located in other casinos 612 or at other locations on the communications network 614.

The wagering game machines 602 and wagering game server 606 can include hardware and machine-readable media including instructions for performing the operations described herein.

The wagering game machines 602 described herein can take any suitable form, such as floor standing models, handheld mobile units, bartop models, workstation-type console models, etc. Further, the wagering game machines 602 can be primarily dedicated for use in conducting wagering games, or can include non-dedicated devices, such as mobile phones, personal digital assistants, personal computers, etc. In one embodiment, the wagering game network 600 can include other network devices, such as accounting servers, wide area progressive servers, player tracking servers, and/or other devices suitable for use in connection with embodiments of the invention.

In various embodiments, wagering game machines 602 and wagering game servers 606 work together such that a wagering game machine 602 may be operated as a thin, thick, or intermediate client. For example, one or more elements of game play may be controlled by the wagering game machine 602 (client) or the wagering game server 606 (server). Game play elements may include executable game code, lookup tables, configuration files, game outcome, audio or visual representations of the game, game assets or the like. In a thin-client example, the wagering game server 606 may perform functions such as determining game outcome or managing assets, while the wagering game machine 602 may be used merely to present the graphical representation of such outcome or asset modification to the user (e.g., player). In a thick-client example, game outcome may be determined locally (e.g., at the wagering game machine 602) and then communicated to the wagering game server 606 for recording or managing a player's account.

Similarly, functionality not directly related to game play may be controlled by the wagering game machine 602 (client) or the wagering game server 606 (server) in embodiments. For example, power conservation controls that manage a display screen's light intensity may be managed centrally (e.g., by the wagering game server 606) or locally (e.g., by the wagering game machine 602). Other functionality not directly related to game play may include presentation of advertising, software or firmware updates, system quality or security checks, etc.

Example Wireless Environment

In some embodiments, the wireless access point 604 and wagering game machines 602 can communicate orthogonal frequency division multiplexed (OFDM) communication signals over a multicarrier communication channel. The multicarrier communication channel can be within a predetermined frequency spectrum and can comprise a plurality of orthogonal subcarriers. In some embodiments, the multicarrier signals can be defined by closely spaced OFDM subcarriers. Each subcarrier can have a null at substantially a center frequency of the other subcarriers and/or each subcarrier can have an integer number of cycles within a symbol period. In some embodiments, the wireless access point 604 and wagering game machines 602 can communicate in accordance with a broadband multiple access technique, such as orthogonal frequency division multiple access (OFDMA). In some embodiments, the wireless access point 604 and wagering game machines 602 can communicate using spread-spectrum signals.

In some embodiments, the wireless access point 604 can be part of a communication station, such as wireless local area network (WLAN) communication station including a Wireless Fidelity (WiFi) communication station, or a WLAN access point (AP). In these embodiments, the wagering game machines 602 can be part of a mobile station, such as WLAN mobile station or a WiFi mobile station.

In some other embodiments, the wireless access point 604 can be part of a broadband wireless access (BWA) network communication station, such as a Worldwide Interoperability for Microwave Access (WiMax) communication station, as the wireless access point 604 can be part of almost any wireless communication device. In these embodiments, the wagering game machines 602 can be part of a BWA network communication station, such as a WiMax communication station.

In some embodiments, any of the wagering game machines 602 can part of a portable wireless communication device, such as a personal digital assistant (PDA), a laptop or portable computer with wireless communication capability, a web tablet, a wireless telephone, a wireless headset, a pager, an instant messaging device, a digital camera, a television, a medical device (e.g., a heart rate monitor, a blood pressure monitor, etc.), or other device that can receive and/or transmit information wirelessly.

Example Wagering Game Machine

Figure 7:
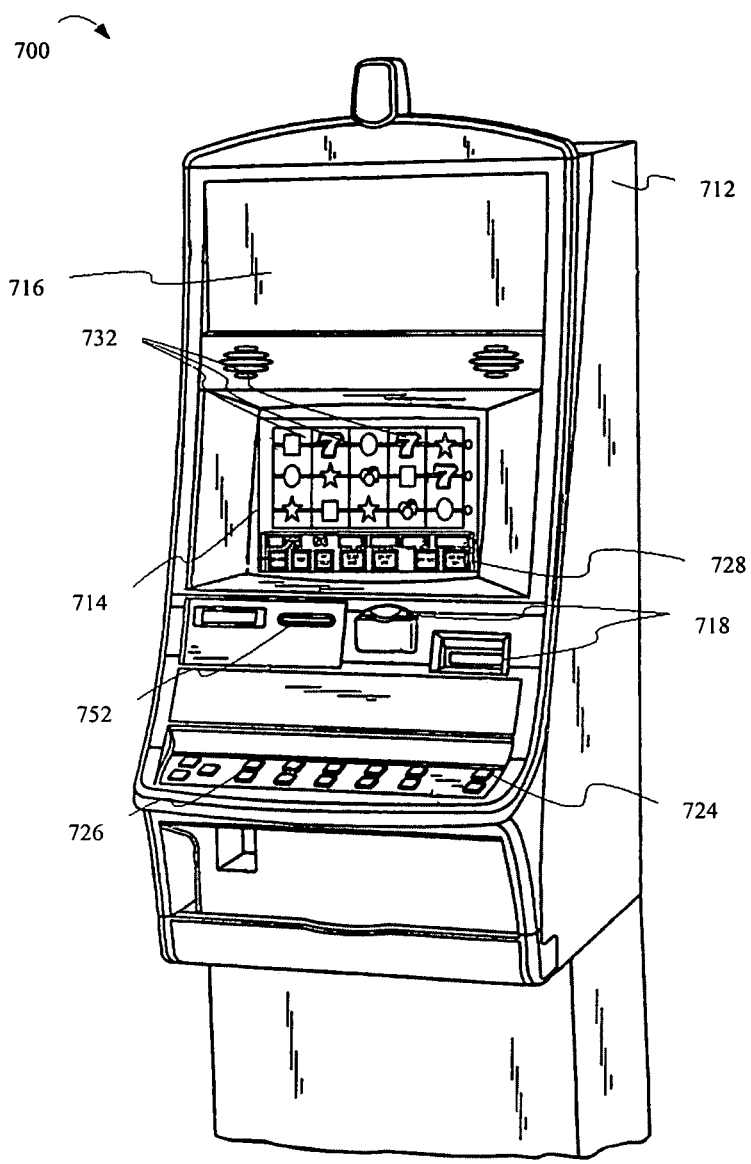
FIG. 7 is a perspective view of a wagering game machine that may use the resource validation system and methods, according to an example embodiment of the invention.

FIG. 7 is a perspective view of a wagering game machine, according to example embodiments of the invention. Referring to FIG. 7, a wagering game machine 700 is used in gaming establishments, such as casinos. According to embodiments, the wagering game machine 700 can be any type of wagering game machine and can have varying structures and methods of operation. For example, the wagering game machine 700 can be an electromechanical wagering game machine configured to play mechanical slots, or it can be an electronic wagering game machine configured to play video casino games, such as blackjack, slots, keno, poker, blackjack, roulette, etc.

The wagering game machine 700 comprises a housing 712 and includes input devices, including value input devices 718 and a player input device 724. For output, the wagering game machine 700 includes a primary display 714 for displaying information about a basic wagering game. The primary display 714 can also display information about a bonus wagering game and a progressive wagering game. The wagering game machine 700 also includes a secondary display 716 for displaying wagering game events, wagering game outcomes, and/or signage information. While some components of the wagering game machine 700 are described herein, numerous other elements can exist and can be used in any number or combination to create varying forms of the wagering game machine 700.

The value input devices 718 can take any suitable form and can be located on the front of the housing 712. The value input devices 718 can receive currency and/or credits inserted by a player. The value input devices 718 can include coin acceptors for receiving coin currency and bill acceptors for receiving paper currency. Furthermore, the value input devices 718 can include ticket readers or barcode scanners for reading information stored on vouchers, cards, or other tangible portable storage devices. The vouchers or cards can authorize access to central accounts, which can transfer money to the wagering game machine 700.

The player input device 724 comprises a plurality of push buttons on a button panel 726 for operating the wagering game machine 700. In addition, or alternatively, the player input device 724 can comprise a touch screen 728 mounted over the primary display 714 and/or secondary display 716.

The various components of the wagering game machine 700 can be connected directly to, or contained within, the housing 712. Alternatively, some of the wagering game machine's components can be located outside of the housing 712, while being communicatively coupled with the wagering game machine 700 using any suitable wired or wireless communication technology.

The operation of the basic wagering game can be displayed to the player on the primary display 714. The primary display 714 can also display a bonus game associated with the basic wagering game. The primary display 714 can include a cathode ray tube (CRT), a high resolution liquid crystal display (LCD), a plasma display, light emitting diodes (LEDs), or any other type of display suitable for use in the wagering game machine 700. Alternatively, the primary display 714 can include a number of mechanical reels to display the outcome. In FIG. 7, the wagering game machine 700 is an "upright" version in which the primary display 714 is oriented vertically relative to the player. Alternatively, the wagering game machine can be a "slant-top" version in which the primary display 714 is slanted at about a thirty-degree angle toward the player of the wagering game machine 700. In yet another embodiment, the wagering game machine 700 can exhibit any suitable form factor, such as a free standing model, bartop model, mobile handheld model, or workstation console model.

A player begins playing a basic wagering game by making a wager via the value input device 718. The player can initiate play by using the player input device's buttons or touch screen 728. The basic game can include arranging a plurality of symbols along a payline 732, which indicates one or more outcomes of the basic game. Such outcomes can be randomly selected in response to player input. At least one of the outcomes, which can include any variation or combination of symbols, can trigger a bonus game.

In some embodiments, the wagering game machine 700 can also include an information reader 752, which can include a card reader, ticket reader, bar code scanner, RFID transceiver, or computer readable storage medium interface. In some embodiments, the information reader 752 can be used to award complimentary services, restore game assets, track player habits, etc.

Another Example Wagering Game Machine

Figure 8:
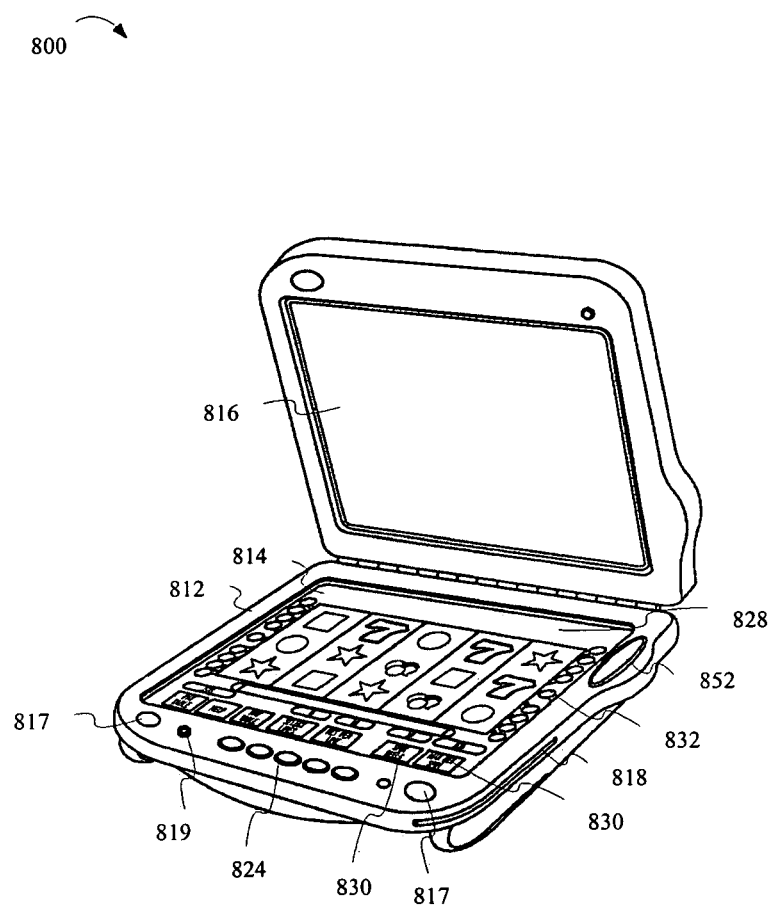
FIG. 8 shows a wagering game machine that may use the resource validation system and methods, according to an example embodiment of the invention.

FIG. 8 shows an example embodiment of a wagering game machine 800. Like free standing wagering game machines, in a handheld or mobile form, the wagering game machine 800 can include any suitable electronic device configured to play a video casino games such as blackjack, slots, keno, poker, blackjack, and roulette. The wagering game machine 800 comprises a housing 812 and includes input devices, including a value input device 818 and a player input device 824. For output, the wagering game machine 800 includes a primary display 814, a secondary display 816, one or more speakers 817, one or more player-accessible ports 819 (e.g., an audio output jack for headphones, a video headset jack, etc.), and other conventional I/O devices and ports, which may or may not be player-accessible. In the embodiment depicted in FIG.

8, the wagering game machine 800 comprises a secondary display 816 that is rotatable relative to the primary display 814. The optional secondary display 816 can be fixed, movable, and/or detachable/attachable relative to the primary display 814. Either the primary display 814 and/or secondary display 816 can be configured to display any aspect of a non-wagering game, wagering game, secondary game, bonus game, progressive wagering game, group game, shared-experience game or event, game event, game outcome, scrolling information, text messaging, emails, alerts or announcements, broadcast information, subscription information, and wagering game machine status.

The player-accessible value input device 818 can comprise, for example, a slot located on the front, side, or top of the housing 812 configured to receive credit from a stored-value card (e.g., casino card, smart card, debit card, credit card, etc.) inserted by a player. The player-accessible value input device 818 can also comprise a sensor (e.g., an RF sensor) configured to sense a signal (e.g., an RF signal) output by a transmitter (e.g., an RF transmitter) carried by a player. The player-accessible value input device 818 can also or alternatively include a ticket reader, or barcode scanner, for reading information stored on a credit ticket, a card, or other tangible portable credit or funds storage device. The credit ticket or card can also authorize access to a central account, which can transfer money to the wagering game machine 800.

Still other player-accessible value input devices 818 can require the use of touch keys 830 on the touch-screen display (e.g., primary display 814 and/or secondary display 816) or player input devices 824. Upon entry of player identification information and, preferably, secondary authorization information (e.g., a password, PIN number, stored value card number, predefined key sequences, etc.), the player can be permitted to access a player's account. As one potential optional security feature, the wagering game machine 800 can be configured to permit a player to only access an account the player has specifically set up for the wagering game machine 800. Other conventional security features can also be utilized to, for example, prevent unauthorized access to a player's account, to minimize an impact of any unauthorized access to a player's account, or to prevent unauthorized access to any personal information or funds temporarily stored on the wagering game machine 800.

The player-accessible value input device 818 can itself comprise or utilize a biometric player information reader which permits the player to access available funds on a player's account, either alone or in combination with another of the aforementioned player-accessible value input devices 818. In an embodiment wherein the player-accessible value input device 818 comprises a biometric player information reader, transactions such as an input of value to the wagering game machine 800, a transfer of value from one player account or source to an account associated with the wagering game machine 800, or the execution of another transaction, for example, could all be authorized by a biometric reading, which could comprise a plurality of biometric readings, from the biometric device.

Alternatively, to enhance security, a transaction can be optionally enabled only by a two-step process in which a secondary source confirms the identity indicated by a primary source. For example, a player-accessible value input device 818 comprising a biometric player information reader can require a confirmatory entry from another biometric player information reader 852, or from another source, such as a credit card, debit card, player ID card, fob key, PIN number, password, hotel room key, etc. Thus, a transaction can be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 818 can be provided remotely from the wagering game machine 800.

The player input device 824 comprises a plurality of push buttons on a button panel for operating the wagering game machine 800. In addition, or alternatively, the player input device 824 can comprise a touch screen mounted to a primary display 814 and/or secondary display 816. In one aspect, the touch screen is matched to a display screen having one or more selectable touch keys 830 selectable by a user's touching of the associated area of the screen using a finger or a tool, such as a stylus pointer. A player enables a desired function either by touching the touch screen at an appropriate touch key 830 or by pressing an appropriate push button on the button panel. The touch keys 830 can be used to implement the same functions as push buttons. Alternatively, the push buttons 832 can provide inputs for one aspect of the operating the game, while the touch keys 830 can allow for input needed for another aspect of the game. The various components of the wagering game machine 800 can be connected directly to, or contained within, the housing 812, as seen in FIG. 8, or can be located outside the housing 812 and connected to the housing 812 via a variety of wired (tethered) or wireless connection methods. Thus, the wagering game machine 800 can comprise a single unit or a plurality of interconnected (e.g., wireless connections) parts which can be arranged to suit a player's preferences.

The operation of the basic wagering game on the wagering game machine 800 is displayed to the player on the primary display 814. The primary display 814 can also display the bonus game associated with the basic wagering game. The primary display 814 preferably takes the form of a high resolution LCD, a plasma display, an LED, or any other type of display suitable for use in the wagering game machine 800. The size of the primary display 814 can vary from, for example, about a 2-3" display to a 15" or 17" display. In at least some embodiments, the primary display 814 is a 7"-10" display. In one embodiment, the size of the primary display can be increased. Optionally, coatings or removable films or sheets can be applied to the display to provide desired characteristics (e.g., anti-scratch, anti-glare, bacterially-resistant and anti-microbial films, etc.). In at least some embodiments, the primary display 814 and/or secondary display 816 can have a 16:9 aspect ratio or other aspect ratio (e.g., 4:3). The primary display 814 and/or secondary display 816 can also each have different resolutions, different color schemes, and different aspect ratios.

As with the free standing embodiments a wagering gaming machine, a player begins play of the basic wagering game on the wagering game machine 800 by making a wager (e.g., via the value input device 718 or an assignment of credits stored on the handheld gaming machine via the touch screen keys 830, player input device 824, or buttons 832) on the wagering game machine 800. In some embodiments, the basic game can comprise a plurality of symbols arranged in an array, and includes at least one payline 828 that indicates one or more outcomes of the basic game. Such outcomes can be randomly selected in response to the wagering input by the player. At least one of the plurality of randomly selected outcomes can be a start-bonus outcome, which can include any variations of symbols or symbol combinations triggering a bonus game.

In some embodiments, the player-accessible value input device 818 of the wagering game machine 800 can double as a player information reader 852 that allows for identification of a player by reading a card with information indicating the player's identity (e.g., reading a player's credit card, player ID card, smart card, etc.). The player information reader 852 can alternatively or also comprise a bar code scanner, RFID transceiver or computer readable storage medium interface. In one embodiment, the player information reader 852 comprises a biometric sensing device.

GENERAL

In this detailed description, reference is made to specific examples by way of drawings and illustrations. These examples are described in sufficient detail to enable those skilled in the art to practice the inventive subject matter, and serve to illustrate how the inventive subject matter can be applied to various purposes or embodiments. Other embodiments are included within the inventive subject matter, as logical, mechanical, electrical, and other changes can be made to the example embodiments described herein. Features or limitations of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims.

Each of the embodiments described herein are contemplated as falling within the inventive subject matter, which is set forth in the following claims.

What is claimed is:

1. A system, comprising:
   a BIOS residing on a gaming machine to configure the gaming machine at startup, wherein at least a portion of the BIOS includes an access key to at least partially validate a resource for loading within the gaming machine during the startup; and
   a digital certificate accessible to the gaming machine during the startup and the digital certificate is incomplete and incapable of being validated, wherein the digital certificate is adapted to be at least partially validated at the startup via the access key included in the BIOS by adding the access key to padded characters in the digital certificate to complete the digital certificate for validation, and wherein validation of the resource depends on successful validation of the digital certificate, the digital certificate completed by the BIOS supplying the access key within the digital certificate at locations for the padded characters.

2. The system of claim 1, wherein the access key is a public key associated with a distributor of the gaming machine.

3. The system of claim 1, wherein the resource is a wagering gaming software service or a suite of wagering gaming software services, and wherein the gaming machine is a wagering gaming device.

4. The system of claim 1, wherein the digital certificate is incomplete until integrated with the access key from the BIOS.

5. The system of claim 4, wherein the digital certificate includes or integrates with additional access keys acquired from the BIOS, the additional keys are associated with other resources.

6. The system of claim 4, wherein the digital certificate is in an X.509 compliant format when combined with the access key.

7. The system of claim 1, wherein the digital certificate resides in one of the following: memory associated with the gaming machine, storage associated with the gaming machine, a different gaming machine operable to communicate with the gaming machine, an operating system of the gaming machine, or a removable machine-readable medium operable to communicate with the gaming machine.

8. The system of claim 1 further comprising:
   a digital signature data structure accessible to the gaming machine and associated with the digital certificate; and
   a validation service, wherein at the startup the validation service is operable to merge the access key with the digital certificate, to generate a checksum value on a selective portion of the resource, to decrypt the digital signature data structure with the access key and to compare the decrypted digital signature data structure against the checksum value to initially determine when subsequent validation against the digital certificate can permissibly proceed.

9. A method, comprising:
   detecting a startup condition of a gaming machine;
   obtaining an access key from a BIOS of the gaming machine;
   acquiring a digital certificate associated with a resource to be loaded within the gaming machine;
   attempting to validate a digital signature of the digital certificate with the access key by completing the digital certificate by inserting the access key into an incomplete digital certificate at locations for padded characters within the incomplete digital certificate; and
   attempting to validate the digital certificate when the digital signature is validated.

10. The method of claim 9 further comprising, permitting the resource to load within the gaming machine when the digital certificate is validated.

11. The method of claim 9 further comprising, initially comparing the access key with another key included in the digital certificate and when the comparison fails, aborting the attempt to validate the digital signature.

12. The method of claim 9, wherein attempting to validate the digital certificate further includes merging the access key into a selective location of the digital certificate before inspecting additional information included in the digital certificate for further validation of the digital certificate.

13. The method of claim 9, wherein attempting to validate the digital certificate further includes determining that the digital certificate is invalid when a condition defined in the digital certificate indicates a version of the resource, which is attempting to load within the gaming machine, is invalid.

14. The method of claim 9, wherein attempting to validate the digital certificate further includes, enlisting assistance of a digital certificate validation service to resolve validation of the digital certificate.

15. The method of claim 9, wherein acquiring the digital certificate further includes obtaining the digital certificate from one of the following: memory associated with the gaming machine, an operating system associated with the gaining machine, an image version of the resource accessible from the gaming machine, storage associated with the gaming machine, a device in communication with the gaming machine, a portion of the resource that is attempting to load within the gaming machine, a server service over a network connection, or a machine-accessible medium in communication with the gaming machine.

16. A machine-readable medium encoded with instructions, which when processed perform a method comprising;
  generating a digital certificate that is to be subsequently used to validate a resource for loading within a gaming machine;
  removing from the digital certificate a public key to produce a modified digital certificate that is incomplete and incapable of being validated without reinserting the public key into the modified digital certificate and padded characters are inserted into the modified digital certificate for where the public key was originally;
  producing a digital signature for a portion of the resource using a private key associated with the public key; and
  packaging the modified digital certificate and the signature for subsequent distribution to the gaming machine, the modified digital certificate incapable of being validated until the public key is reinserted where the padded characters are within the modified digital certificate.

17. The medium of claim 16 further comprising instructions for transmitting the modified digital certificate and the signature over a network to the gaming machine.

18. The medium of claim 17 further comprising instructions for transmitting the resource over the network to the gaming machine.

19. The medium of claim 17, wherein generating further includes producing the digital certificate in an X.509 compliant format.

20. The medium of claim 17, wherein packaging further includes creating an install package for the resource on the gaming machine, wherein the install package includes the resource, the modified digital certificate, and the signature.

21. The medium of claim 17, wherein packaging further includes embedding the modified digital certificate and the signature in an operating system to be installed on or delivered to the gaming machine.

* * * * *

UNITED STATES PATENT AND TRADEMARK OFFICE
CERTIFICATE OF CORRECTION

PATENT NO. : 8,613,661 B2  Page 1 of 1
APPLICATION NO. : 12/523435
DATED : December 24, 2013
INVENTOR(S) : Srinivyasa M. Adiraju It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 860 days.

Signed and Sealed this
Twenty-second Day of September, 2015

Michelle K. Lee
*Director of the United States Patent and Trademark Office*